United States Patent Office 3,230,218
Patented Jan. 18, 1966

3,230,218
PROCESS FOR PREPARING DERIVATIVES OF 7-SULFAMYL - 6 - TRIFLUOROMETHYL - 1,2,4 - BENZOTHIADIAZINE-1,1-DIOXIDE
Lee C. Cheney, Fayetteville, and Charles T. Holdrege, Camillus, N.Y., assignors, by mesne assignments, to Bristol-Myers Company, New York, N.Y., a corporation of Delaware
No Drawing. Filed Feb. 26, 1959, Ser. No. 795,595
1 Claim. (Cl. 260—243)

This invention relates to novel diuretic and natriuretic agents of therapeutic value and, more particularly, to 3-substituted-6-trifluoromethyl-7-sulfamyl-3,4-dihydro-1,2,4-benzothiadiazine-1,1-dioxides and nontoxic metal salts thereof.

In the treatment of many diseases characterized by an excessive accumulation of water in the body, such as the edemas associated with congestive heart failure, toxemia of pregnancy, tension, and in the alleviation of salt retention caused by therapy with certain steroids such as cortisone, the physician requires an agent which will cause the body to excrete water. Previous agents used for this purpose have had many drawbacks. Thus, ammonium salts are not very effective and cause acidosis, xanthine derivatives do not remove water already stored in the body, carbonic anhydrase inhibitors are not very effective and cause undesirable side effects and organic mercurial compounds retain their effectiveness only for limited periods of time, are toxic by nature and must normally be given by injection.

It is the object of the present invention to provide a therapeutic agent of the diuretic type which is highly potent even on prolonged use and does not cause toxic side effects or undesirable metabolic disturbances such as excessive potassium excretion and, preferably, acts by causing the body to excrete roughly equal amounts of sodium and chloride ions.

The object of the present invention has been attained by the provision, according to the present invention, of a member selected from the group consisting of a compound having the formula

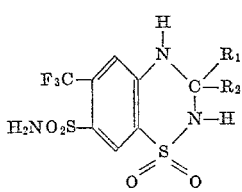

wherein $R_1$ is a member selected from the group consisting of hydrogen and lower alkyl, $R_2$ is a member selected from the group consisting of lower alkyl, trichloro-methyl, aralkyl (such as benzyl, phenethyl and benzhydryl), aryl (e.g. phenyl and substituted phenyl such as chlorophenyl, methoxyphenyl and tolyl), pyridyl, thienyl and furyl, and $R_1$ and $R_2$ when taken together from spiroalkyl (e.g. when taken together with the carbon atom of the thiadiazine ring form cyclopentyl, cyclohexyl or cycloheptyl); and nontoxic metal salts thereof.

The preferred compounds of the present invention are those having the formula

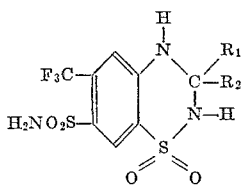

wherein $R_1$ and $R_2$ represent (lower) alkyl, and

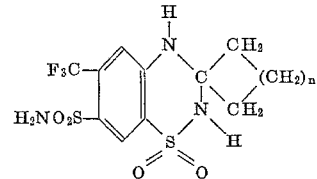

wherein $n$ is an integer from 2 to 4 inclusive.

The compounds of the present invention are converted to nontoxic metal salts including calcium, magnesium and aluminum salts and preferably to an alkali metal salt such as sodium or potassium, by treatment with one equivalent of alkali, e.g. one equivalent of aqueous sodium hydroxide. The compounds of the present invention are administered orally in the form of capsules or tablets or, if desired, parenterally as aqueous suspensions or as solutions in dilute aqueous alkali or in nontoxic organic solvents of the hydroxylic type. Dosage is, of course, at the discretion of the physician but representative daily dosages, which may be given in one dose or be divided and given at intervals, fall in the range of 200 mgm. to 3 g. and preferably 500 to 100 mgm.

The compounds of the present invention are prepared by heating (e.g. to reflux for periods of time ranging between fifteen minutes to 24 hours; lower temperatures are satisfactory but require longer heating times; a typical temperature of heating is in the range of 50–150° C. and preferably about 80–140° C.) 2,4-disulfamyl-5-trifluoromethylaniline with at least an equimolar amount of the appropriate carbonyl compound or derivative such as an acetal or ketal. When the carbonyl compound is a liquid, an excess may be used to serve as the liquid medium for the reaction; otherwise it is advantageous to use a solvent such as water, acetic acid or n-butanol. It is often helpful to add small amounts of a mineral acid as a catalyst.

In a particular instance, there is included within the present invention the process of preparing a compound having the formula

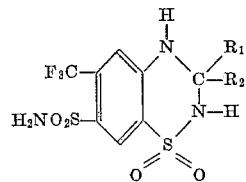

wherein $R_1$ and $R_2$ represent (lower) alkyl which comprises heating 2,4-disulfamyl-5-trifluoromethylaniline with more than an equimolar amount of a member selected from the group consisting of compounds having the formula

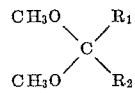

where $R_1$ and $R_2$ represent (lower) alkyl. Corresponding ketals with ethylene glycol and with glycerol are equally useful in this reaction.

Also included within the scope of this invention are the process of preparing a compound having the formula

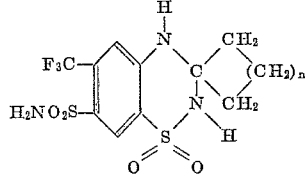

where $n$ is an integer from 2 to 4 inclusive which comprises heating 2,4-disulfamyl-5-trifluoromethylaniline in a solvent in the presence of an acid catalyst with more than an equimolar amount of a compound having the formula

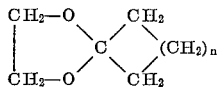

where $n$ is an integer from 2 to 4 inclusive; and the process of preparing a compound having the formula

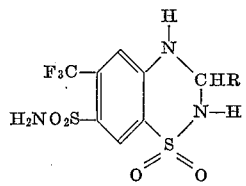

wherein R represents a member selected from the group consisting of (lower)alkyl, trichloromethyl, aralkyl, aryl, pyridyl, thienyl and furyl which comprises heating 2,4-disulfamyl-5-trifluoromethylaniline in a solvent in the presence of an acid catalyst with at least an equimolar amount of a carbonyl compound selected from the group consisting of aldehydes having the formula

where $R_3$ is a member selected from the group consisting of (lower)alkyl, trichloromethyl, aralkyl, aryl, pyridyl, thienyl and furyl. Corresponding acetals, as with ethylene glycol, are also useful and, indeed, are preferred in some instances, e.g. for the higher aliphatic aldehydes.

The following examples will serve to illustrate the invention without limiting it thereto.

EXAMPLE 1

7-sulfamyl-6 - trifluoromethyl-3,3-dimethyl - 1,2,4-benzothiadiazine-1,1-dioxide.

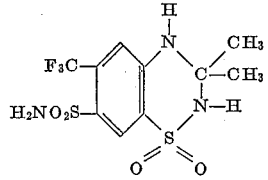

2,4-disulfamyl-5-trifluoromethylaniline (5.0 g., 0.0155 mole) and 98% 2,2-dimethoxypropane (45 ml.) were mixed together and refluxed for 24 hours. The initial suspension cleared after 4 hours reflux to reveal a ball of gum at the bottom of the flask. After four more hours reflux the suspension reappeared and persisted throughout the reaction time.

The solvent was stripped (removed by distillation) under reduced pressure on a steam bath, leaving as a solid brown residue the product 7-sulfamyl-6-trifluoromethyl-3,3-dimethyl-1,2,4 - benzothiadiazine-1,1-dioxide, which was insoluble in hot water. The product was recrystallized twice from 20 ml. of methanol plus 100 ml. of water to yield 2.5 g., M.P. 212°–221° C. Two more recrystallizations from methanol-water were performed to yield 1.6 g. of crystals, M.P. 216°–221° C.

*Analysis.*—Calc'd for $C_{10}H_{12}F_3N_3O_4S_2$: C, 33.40; H, 3.34. Found: C, 33.11; H, 3.49.

Upon parenteral administration to animals, this compound proved to be a potent natriuretic agent of low toxicity.

EXAMPLE 2

Substitution for the 2,2-dimethoxypropane in the procedure of Example 1 of an equal volume of 2,2-dimethoxybutane, 2,2 - dimethoxyhexane, 2,2 - dimethoxyoctane and 4,4-dimethoxyheptane, respectively, produces the non-toxic, diuretic agents 7-sulfamyl-6-trifluoromethyl-3-methyl-3-ethyl-1,2,4 - benzothiadiazine-1,1-dioxide, 7-sulfamyl-6-trifluoromethyl - 3-methyl-3-n - butyl-1,2,4 - benzothiadiazine-1,1-dioxide, 7-sulfamyl-6-trifluoromethyl-3-methyl-3-n-hexyl - 1,2,4-benzothiadiazine - 1,1-dioxide and 7-sulfamyl-6-trifluoromethyl-3,3 - di-n-propyl-1,2,4-benzothiadiazine-1,1-dioxide, respectively.

EXAMPLE 3

7 - sulfamyl-6-trifluoromethyl-3,3-dimethyl-1,2,4-benzothiadiazine-1,1-dioxide.

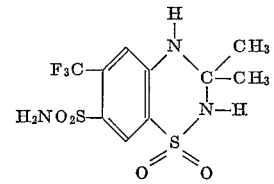

4-amino-6 - trifluoromethylbenzene - 1,3-disulfonamide (0.2 mole, 48.0 g.) and 2,2-dimethoxypropane (100 ml.) were mixed together and heated at reflux for 24 hours to precipitate the product, 7-sulfamyl-6-trifluoromethyl-3,3-dimethyl - 1,2,4-benzothiadiazine - 1,1-dioxide, which was collected by filtration and recrystallized from methanol and water to yield a light tan crystalline solid, wt. 4.8 g., M.P. 210°–222° C. A second recrystallization from methanol and water gave 3.7 g., M.P. 217°–225° C.

*Analysis.*—Calc'd. for $C_{10}H_{12}N_3O_4S_2F_3$: C, 33.40; H, 3.34. Found: C, 33.35; H, 3.34.

Use of a larger excess of the ketal, e.g., 350 ml., improves the yield.

This compound exhibited low toxicity and strong diuretic activity.

EXAMPLE 4

7-sulfamyl-6-trifluoromethyl - 3-ethyl-3,4-dihydro-1,2,4-benzothiadiazine-1,1-dioxide.

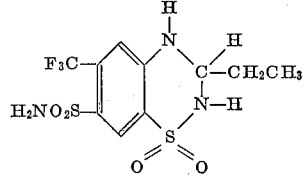

2,4-disulfamyl-5-trifluoromethylaniline (5 g., 0.0157 mole), propionaldehyde (0.0173 mole, 1.0 g.), 30 ml. water and one drop of concentrated sulfuric acid were mixed and heated at reflux. At first the disulfonamide appeared to be going into solution. Soon the product, 7-sulfamyl-6 - trifluoromethyl-3-ethyl-3,4 - dihydro-1,2,4-benzothiadiazine-1,1-dioxide, separated in quantity as a white crystalline solid (solution was not obtained). The mixture was refluxed for four hours; the quantity of solid appeared to remain about the same. The product was collected by filtration. Since the reaction mixture had foamed into the condenser, a quantity of product was stuck there. This was removed with 100 ml. water (the product appears quite insoluble in water). After air drying the product had M.P. 255°–259° C. dec., 4.9 g. The product was dissolved in 85 ml. acetone at the B.P. and filtered hot and the warm, filtered acetone solution was dissolved in 85 ml. water. Chilling and scratching gave crystalline product which was collected by filtration and vacuum dried over $P_2O_5$, to give 2.3 g., M.P. 256°–258° C. dec. A sample of the material dried at 65° C. over $P_2O_5$, had M.P. 256°–258° C. dec. and was designated 1A and submitted for analysis.

The filtrate from the aqueous acetone on standing deposited a second crop which was cooled and collected by filtration as 1B; M.P. 262–263° C. dec.

This compound was found to be a potent diuretic agent of low toxicity.

Sample 1A was analyzed.

*Analysis.*—Calc'd. for $C_{10}H_{12}F_3N_3O_4S_2$: C, 33.4; H, 3.37; N, 11.7. Found: C, 33.86; H, 3.59; N, 11.7.

Sample 1B was analyzed.

*Analysis.*—Calc'd. for $C_{10}H_{12}F_3N_3O_4S_2$: C, 33.4; H, 3.37; N, 11.7. Found: C, 33.72; H, 3.44; N, 11.88.

Sample 1B was insoluble in water and soluble in aqueous sodium hydroxide, forming the sodium salt.

EXAMPLE 5

Use in the procedure of Example 4 in place of the propionaldehyde of an equimolar amount of the ethylene glycol acetals of n-butyraldehyde, isovaleraldehyde, n-caproic aldehyde and isobutyraldehyde, respectively, produces as nontoxic, diuretic agents the compounds 7-sulfamyl - 6 - trifluoromethyl-3-n-propyl-1,2,4-benzothiadiazine-1,1-dioxide, 7-sulfamyl-6-trifluoromethyl-3-isobutyl-1,2,4-benzothiadiazine-1,1-dioxide, 7-sulfamyl-6-trifluoromethyl-3-n-amyl-1,2,4-benzothiadiazine-1,1-dioxide and 7-sulfamyl-6-trifluoromethyl-3-iso-propyl-1,2,4 - benzothiadiazine-1,1-dioxide, respectively.

EXAMPLE 6

7-sulfamyl-6-trifluoromethyl-3-methyl - 3,4 - dihydro-1,2,4-benzothiadiazine-1,1-dioxide.

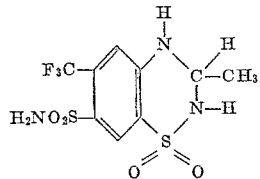

2,4-disulfamyl-5-trifluoromethylaniline (5 g., 0.0157 mole) and acetaldehyde (0.0173 mole [10% excess], 0.76 g.) and one drop concentrated $H_2SO_4$ were mixed in 30 ml. water and heated to the reflux point over a period of ten minutes. At first the disulfonamide appeared to go into solution, then additional solid separated. At the boiling point a suspension of what crystalline solid was present. When the reflux point was reached, heating was stopped and the flask set aside at room temperature for one hour. After chilling in an ice bath, the crystalline, solid product, 7-sulfamyl-6-trifluoromethyl-3-methyl-3,4-dihydro-1,2,4-benzothiadiazine-1,1-dioxide, was collected by filtration and air dried, 5 g., softened at 240° C., decomposed 247°–252° C. Recrystallization from a mixture of equal volumes of water and 95% ethanol (a relatively large volume was required), gave 3.9 g., M.P. 247°–250° C., dec. Samples dried at 65° C. in vacuo over $P_2O_5$ and then weighed 3.8 g., 70.2%.

*Analysis.*—Calc'd. for $C_9H_{10}F_3N_3O_4S_2$: C, 31.3; H, 2.93; N, 12.16 Found: C, 31.5, 31.3; H, 2.98, 3.00; N, 12.18.

This compound exhibited strong diuretic activity and low toxicity upon parenteral administration.

EXAMPLE 7

7-sulfamyl-6-trifluoromethyl - 3 - benzyl - 3,4 - dihydro-1,2,4,-benzothiadiazine-1,1-dioxide.

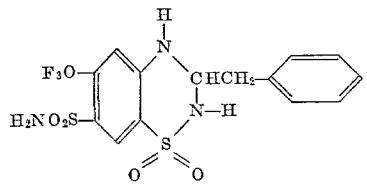

3,4-disulfamyl-5-trifluoromethylaniline (5 g., 0.0157 mole) and phenylacetaldehyde (50% alcoholic solution; 0.0173 m.=2.089 g. of 100%=4.16 g. of 50%) were mixed in 30 ml. glacial acetic acid and heated at reflux for sixteen hours. The mixture was then stripped at reduced pressure to give as a yellow-orange viscous residue the product, 7-sulfamyl-6-trifluoromethyl-3-benzyl-3,4-dihydro-1,2,4-benzothiadiazine-1,1-dioxide, which was dissolved in 50% aqueous ethanol at the boiling point. After standing in an ice bath several hours, crystalline product separated and was collected by filtration, air-dried and found to melt at 205°–215° C., 4.7 g., yellow. The filtrate deposited a second crop on standing several days, 1.5 g., M.P. 216°–220° C. The second crop was dissolved in 10 ml. methanol at room temperature, water was added in small portions until turbid, and addition of a few drops methanol gave a clear solution from which there was obtained 1.2 g. product, M.P. 221°–223° C. Repeated recrystallizations in the same manner gave crystalline product, 2.3 g., which was vacuum dried at 65° C. over $P_2O_5$, M.P. 221°–223° C. (sample immersed at 215° C.).

*Analysis.*—Calc'd. for $C_{15}H_{14}F_3N_3O_4S_2$: C, 42.8; H, 3.36; N, 9.98. Found: C, 43.69; H, 3.58; N, 10.31.

This compound was shown to be a diuretic agent of low toxicity.

EXAMPLE 8

Natriuretic agents of low toxicity having the formulae 7-sulfamyl - 6 - trifluoromethyl-3-(2-phenylethyl)-1-2-4-benzothiazine-1,1-dioxide, 7-sulfamyl-6-trifluoromethyl-3-(4-chlorophenyl)-1,2,4-benzothiadiazine-1,1-dioxide, 7-sulfamyl-6-trifluoromethyl-3-(2-methoxyphenyl) - 1,2,4-benzothiadiazine-1,1-dioxide, 7-sulfamyl-6-trifluoromethyl-3-(p-tolyl)-1,2,4-benzothiadiazine-1,1-dioxide, 7-sulfamyl-6 - trifluoromethyl-3-(2-thienyl)-1,2,4-benzothiadiazine-1,1-dioxide and 7-sulfamyl-6-trifluoromethyl-3-(2-furyl)-1,2,4-benzothiadiazine-1,1-dioxide, respectively, are prepared by following the procedure of Example 7 except that the phenylacetaldehyde is replaced by an equimolar weight of 3-phenylpropionaldehyde, p-chlorobenzaldehyde, o-methoxybenzaldehyde, p-methylbenzaldehyde, 2-thiophenaldehyde and furfural, respectively.

EXAMPLE 9

7-sulfamyl-6-trifluoromethyl - 3 - (2 - pyridyl) - 3,4-dihydro-benzothiadiazine-1,1-dioxide.

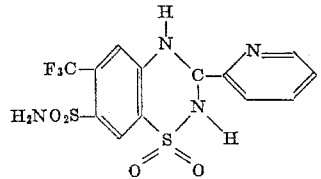

2,4-disulfamyl-5-trifluoromethylaniline (5 g., 0.0157 mole) and pyridine-2-aldehyde (0.0173 mole [10% excess], 1.85 g.) were mixed in 30 ml. water and heated to reflux. During this time an oily layer separated to the bottom of the flask. Soon crystallization of the product, 7-sulfamyl-6-trifluoromethyl-3-(2-pyridyl)-3,4 - dihydro-benzothiadiazine-1,1-dioxide, occurred. The mixture was refluxed for thirty minutes. After chilling in an ice bath, the crystalline product was collected by filtration, dissolved in 45 ml. warm acetone, filtered, and water added in small portions until a slight turbidity was produced. Scratching gave crystalline material. After chilling in an ice bath the solid was collected, air dried and found to weigh 2 g., M.P. 303°–305° C. (black melt). (M.P. taken on an aluminum block heated by a Bunsen burner; to obtain corrected M.P. add 5° C.). Two more recrystallizations from acetone-water gave M.P. 310°–311° C. (black melt).

*Analysis.*—Calc'd. for $C_{13}H_{11}F_3N_4O_4S_2$: C, 38.25; H, 2.71; N, 13.7. Found: C, 38.95; H, 2.58; N, 13.37.

Administration of this compound to animals showed it to be a nontoxic diuretic agent.

EXAMPLE 10

7-sulfamyl-6-trifluoromethyl-3-trichloromethyl-3,4-dihydro-1,2,4-benzothiadiazine-1,1-dioxide.

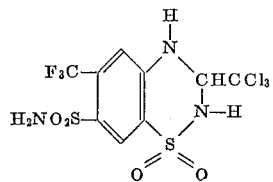

2,4-disulfamyl-5-trifluoromethylaniline (5 g., 0.0157 mole), chloral hydrate (2.6 g., 0.0157 mole) and one drop concentrated $H_2SO_4$ were mixed in 30 ml. water (strongly acid to indicator paper) and heated at reflux for 24 hours. The crystalline solid product, 7-sulfamyl-6-trifluoromethyl-3-trichloromethyl-3,4 - dihydro - 1,2,4-benzothiadiazine-1,1-dioxide, which precipitated was collected by filtration of the hot solution through a heated filter and air dried, 3.2 g., M.P. 273°–276° C. dec. The product was twice dissolved in methanol with warming and water was added in small portions until the turbidity produced just disappeared. Scratching precipitated crystalline material, M.P. 280°–282° C. dec., 1.56 g. A sample of the product was vacuum dried at 65° C. over $P_2O_5$, M.P. 283°–285° C. dec. and submitted for analysis.

*Analysis.*—Calc'd. for $C_9H_7Cl_3F_3N_3O_4S_2$: C, 24.1; H, 1.57; N, 9.35. Found: C, 24.65, 24.40; H, 1.98, 1.83; N, 9.33.

This compound proved to be nontoxic and an effective natriuretic agent.

EXAMPLE 11

7-sulfamyl-6-trifluoromethyl-3-phenyl-3,4-dihydro - 1,2,4- benbzothiadiazine-1,1-dioxide.

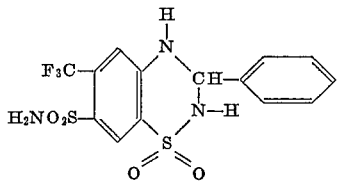

2,4-disulfamyl-5-trifluoromethylaniline (5 g., 0.0157 mole) and benzaldehyde (1.84 g., 0.0173 mole) were mixed in 30 ml. glacial acetic acid and heated at reflux for 24 hours. Cooling failed to give a precipitate. The mixture was stripped of solvent at reduced pressure to give the product, 7-sulfamyl-6-trifluoromethyl-3-phenyl-3,4-dihydro-1,2,4-benzothiadiazine - 1,1 - dioxide, as a crystalline solid. This product was found to be not appreciably soluble in hot water and was recrystallized from a mixture of equal volumes of water and 95% ethanol to give 2.8 g., M.P. 218°–223° C. A second recrystallization gave 1.4 g., M.P. 213°–220° C. The product was dissolved in 10 ml. methanol at room temperature and water was added in small portions until the turbidity produced just vanished. Scratching induced crystallization. Three such recrystallizations gave product melting at 220°–224° C. after drying in vacuo at 65° C. over $P_2O_5$.

*Analysis.*—Calc'd. for $C_{14}H_{12}F_3N_3O_4S_2$: C, 41.3; H, 2.97; N, 10.3. Found: C, 41.61; H, 3.27; N, 10.25.

This compound was found to be a potent, nontoxic diuretic agent.

EXAMPLE 12

7-sulfamyl-6-trifluoromethyl-3-phenyl-3,4 - dihydro - 1,2,4-benzothiadiazine-1,1-dioxide.

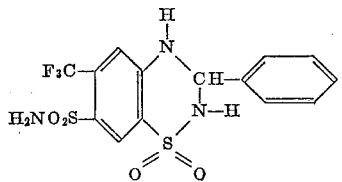

2,4-disulfamyl-5-trifluoromethylaniline (10 g., 0.0314 mole) and benzaldehyde (3.68 g., 0.0347 mole) were mixed in 60 ml. glacial acetic acid and heated at reflux for 4½ hours. The acetic acid was stripped at reduced pressure to give the product, 7-sulfamyl-6-trifluoromethyl-3-phenyl-3,4-dihydro-1,2,4-benzothiadiazine-1,1 - dioxide, as a viscous residual oil. The residue was dissolved in 50 ml. methanol. Addition of 100 ml. water and ice-chilling gave crystalline material which was collected by filtration. An air dried sample had M.P. 215°–220° C. The product was dissolved in 50 ml. methanol, filtered, and water added in small portions until the turbidity produced just disappeared. Scratching caused crystallization. After cooling in an ice bath the product was filtered, M.P. 217°–220° C., 5.4 g. Again recrystallized from methanol (40 ml.)-water in the same manner, M.P. 214°–218° C., 5.0 g. Again recrystallized from methanol-water, M.P. 215°–219° C., 3.7 g. The product was dissolved in 25 ml. methanol, acidified with a few drops 6 N HCl and a small amount of water added, M.P. 219°–222° C., 2.7 g. recovered. The product was again dissolved in 20 ml. methanol, acidified with a few drops 6 N HCl and water added until turbidity just disappeared. The product was collected by filtration and dried in vacuo at 65° C., over $P_2O_5$, 2.15 g., M.P. 219°–221° C.

This compound was found to be of low toxicity and to produce diuresis on administration to animals.

EXAMPLE 13

7-sulfamyl-6-trifluoromethyl - spiro[2H - 1,2,4 - benzothiadiazine-3,1'-cyclohexane]-1,1-dioxide.

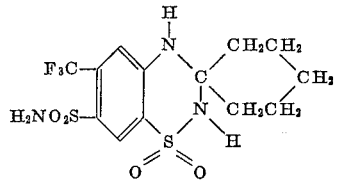

2,4-disulfamyl-5-trifluoromethylaniline (5 g., 0.0157 mole) and the ethylene ketal of cyclohexanone (ketal of cyclohexanone and ethylene glycol; 2.32 g., 0.0173 mole) were mixed in 50 ml. n-butanol and heated at reflux for one hour. The solid slowly went into solution to give a brown one-phase solution. Chilling in an ice bath caused some crystalline material to separate which was removed by filtration, was readily soluble in hot water and was probably disulfonamide.

The butanol filtrates were stripped at reduced pressure to give the product, 7-sulfamyl-6-trifluoromethyl-spiro-[2H-1,2,4-benzothiadiazine-3,1'-cyclohexane]-1,1-dioxide as a gummy residue which was dissolved in 20 ml. methanol and filtered. Water was added to the filtrate in small portions until slightly turbid. Scratching and cooling gave the product as crystalline material which was collected by filtration and air dried, M.P. 255–261° C., 1.44 g.

This product may also be named 7-sulfamyl-6-trifluoromethyl-3,3-(1,5-pentylidene)-3,4-dihydro - 1,2,4 - benzothiadiazine-1,1-dioxide.

This product is a nontoxic, natriuretic agent.

EXAMPLE 14

7-sulfamyl-6-trifluoromethyl-spiro[2H-1,2,4 - benzothiadiazine-3,1'-cyclohexane]-1,1-dioxide.

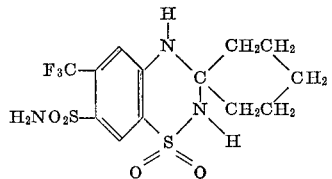

2,4-disulfamyl-5 - trifluoromethylaniline (5 g., 0.0157 mole), the ethylene ketal of cyclohexanone (2.32 g., 0.0173 mole) and two drops concentrated $H_2SO_4$ were mixed in 50 ml. n-butanol and heated at reflux (the solid quickly went into solution) for ninety minutes to give a one-phase, brown solution. The solvent was stripped at reduced pressure to leave as residue the product, 7-sulfamyl-6-trifluoromethyl-spiro[2H-1,2,4-benzothiadiazine - 3,1' - cyclohexane]-1,1-dioxide, as a crystalline solid which was not appreciably soluble in hot water. The solid product was dissolved in 60 ml. methanol at the boiling point and the solution was filtered. Water was added (about 30 ml.) to the filtrate. Cooling and scratching gave crystalline product which was collected by filtration and air dried, M.P. 258°–261° C., 2.82 g. The product was dissolved in 40 ml. warm methanol and 20 ml. water added; ice cooling gave crystalline product of M.P. 259°–261° C. The product was soluble in aqueous sodium hydroxide. A sample dried in vacuo at 65° C. over $P_2O_5$ melted at 260°–262° C.

*Analysis.*—Calc'd. for $C_{13}H_{16}F_3N_3O_4S_2$: C, 39.1; H, 4.04; N, 10.52. Found: C, 39.28; H, 4.29; N, 10.79.

This product was found to be a potent nontoxic diuretic agent.

EXAMPLE 15

Use in the procedure of Example 14, in place of the ethylene ketal of cyclohexanone, of equimolar weights of the ethylene ketals of cyclopentanone, cycloheptanone and phenylacetone, respectively, produces as nontoxic, diuretic agents 7-sulfamyl-6-trifluoromethyl-spiro[2H-1,2,4-benzothiadiazine-3,1'-cyclopentane]-1,1 - dioxide (M.P. 225°–226° C.), 7-sulfamyl-6-trifluoromethyl-spiro[2H - 1,2,4-benzothiadiazine-3,1'-cycloheptane]-1,1-dioxide, and 7-sulfamyl-6-trifluoromethyl-3,4-dihydro-3-methyl-3-benzyl - 1,2,4-benzothiadiazine-1,1-dioxide, respectively.

*Preparation of starting materials*

(a) Ketals of ketones and ethylene glycol

Such compounds are prepared, for example, according to J. Amer. Chem. Soc., 70, 2827, 1948. As a specific example, the ketal of cyclohexanone and ethylene glycol, herein called the ethylene ketal of cyclohexanone, was prepared by stirring and refluxing a mixture of cyclohexanone (1 mole, 98.1 g.), ethylene glycol (1.1 moles, 68.2 g.) and p-toluene-sulfonic acid (1 g.) in 300 ml. toluene in an apparatus equipped with a trap to separate water by azeotropic distillation for four hours until water stopped distilling. The flask was cooled to room temperature, 0.55 g. $Na_2CO_3$ was added to neutralize the acid and the mixture was filtered through glass wool and distilled to give 95.8 g. product, B.P. 54–55° C./7 mm.

(b) 2,4-disulfamyl-5-trifluoromethylaniline (also called 2-trifluoromethyl-4-amino-5-sulfamylbenzenesulfonamide)

To a reaction vessel chilled in an ice bath there is added 750 ml. (11.5 moles) chlorosulfonic acid and 1500 ml. tetrachloroethane. m-Aminobenzotrifluoride (130 ml., 161 g., 1.0 mole) is then added slowly with stirring over a fifteen-minute period. The ice bath is removed and 700 g. (12 moles) sodium chloride is added slowly with stirring over a period of 20–30 minutes. The reaction mixture is then stirred and heated slowly to 120° C. (e.g. over one hour), held at 120° C. for about thirty minutes (and if desired held an additional 30 minutes at 130° C.) and then cooled as rapidly as possible to 30° C. or less. The reaction mixture is quenched by pouring rapidly on a stirred mixture of 4.5 l. ice cubes, plus 3 l. cold water with the temperature of the quench mixture being kept below 20° C. The mixture is then stirred for fifteen minutes and filtered. The filtrate (A) is separated and the solvent layer (S-1) and water layer (W-1) are saved. The tarry cake is slurried in 500 ml. tetrachloroethane to remove adhering rich solvent and product. This mixture is then filtered and the solvent phase (S-2) is stirred with previous water phase (W-1). The solvent layer is separated and added to solvent phase (S-1). The combined solvent phases are extracted three times with concentrated (28%) ammonium hydroxide (500 ml., 250 ml., 250 ml.). The aqueous phases containing the product are separated each time, combined and heated under mild vacuum for about one hour to drive off the ammonia. The product 2-trifluoromethyl-4-amino-5 - sulfamylbenzenesulfonamide then crystallizes out and, after cooling in ice, is collected by filtration, washed with water, dried in an oven at 70° C. and found to weigh 65–70 g. and to melt at 230°–240° C.

Inasmuch as the foregoing specification comprises preferred embodiments of the invention, it is to be understood that variations and modifications may be made therein in accordance with the principles disclosed without departing from the scope of the invention. Such variations specifically include the use, in place of the carbonyl reagents given in the illustrative examples, of other carbonyl compounds, and particularly of isomeric or homologous aldehydes and ketones, either per se or in the form of derivatives such as acetals or ketals with alcohols, glycols or glycerine.

We claim:

The process of preparing a compound having the formula

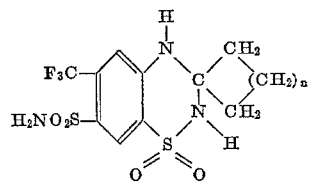

where $n$ is an integer from 2 to 4 inclusive which comprises heating 2,4-disulfamyl-5-trifluoromethylaniline in a solvent in the presence of an acid catalyst with more than an equimolar amount of a compound having the formula

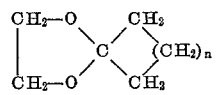

where $n$ is an integer from 2 to 4 inclusive.

References Cited by the Examiner

UNITED STATES PATENTS

| | | | |
|---|---|---|---|
| 2,809,194 | 10/1957 | Novello | 260—243 |
| 2,894,948 | 7/1959 | De Stevens | 260—243 |

OTHER REFERENCES

Freeman et al.: J. Org. Chem., vol. 16, pp. 815, 816, 818, 821, and 835 (1951).

Herrmann et al.: Texas State J. of Medicine, December 1958, pp. 854–858.

Hobolth et al.: Ugeskr. Laeg., vol. 120, p. 1585 (1958).

Sele: Ugeskr. Laeg., vol. 120, p. 1592 (1958).

Wall Street Journal: Nov. 5, 1958, p. 19 (Wash., D.C. ed.).

NICHOLAS S. RIZZO, *Primary Examiner.*

IRVING MARCUS, *Examiner.*

E. K. MERKER, G. S. ROSEN, *Assistant Examiners.*